United States Patent [19]

McNeil et al.

[11] Patent Number: 5,495,379
[45] Date of Patent: Feb. 27, 1996

[54] ERASE BANDS FOR VERTICAL RECORDING

[75] Inventors: Michael McNeil; Harlan Mathews, both of Boulder, Colo.

[73] Assignee: Maxtor Corporation, Longmont, Colo.

[21] Appl. No.: 272,111

[22] Filed: Jul. 7, 1994

[51] Int. Cl.⁶ .................................................. G11B 5/127
[52] U.S. Cl. .................................................. 360/125
[58] Field of Search ............................. 360/125, 121, 360/119, 123, 118

[56] References Cited

U.S. PATENT DOCUMENTS 4,935,832  6/1990  Das et al. .............................. 360/121

Primary Examiner—John H. Wolff
Assistant Examiner—Adriana Giordana
Attorney, Agent, or Firm—Sheridan Ross & McIntosh

[57] ABSTRACT

A magnetic head that vertically records information on a disk and which creates erase bands between the disk tracks. The head has a single pole that has a pair of erase band segments which extend from a center pole section. When the head is writing information, the erase band segments create erase bands at the outer edges of the track by not fully magnetizing the disk and/or increasing the azimuth angle of the magnetized outer edges. The azimuth angle can be increased by constructing the outer segments of the pole to extend at an angle from the center pole section. The reduction in field strength in the outer track edges can be accomplished by making the outer pole segments thinner to cause a saturation of the outer magnetic field. The weaker, angled outer track portions do not generate a significant magnetic field in a head located on an adjacent track, thereby in effect creating erase bands in the disk.

28 Claims, 2 Drawing Sheets

ERASE BANDS FOR VERTICAL RECORDING

BACKGROUND OF THE INVENTION

1. Field of the Invention

The present invention relates to a magnetic head used to vertically record information on the magnetic disk of a hard disk drive.

2. Description of Related Art

Hard disk drives contain at least one magnetic disk that rotates relative to a plurality of magnetic heads. There is typically one head for each disk surface. The magnetic heads are constructed to magnetize and sense the magnetic field of the disk. FIG. 1 shows a conventional magnetic head that has two magnetic poles separated by a gap. A magnetic flux flows between the poles and across the gap. Part of the flux flows into the disk and magnetizes the disk in a direction parallel with the disk surface. The head and method depicted in FIG. 1 is commonly referred to as horizontal recording.

FIG. 2 shows another type of magnetic head which has a single pole that generates a magnetic flux that flows through the disk and back through a return element located at a trailing edge portion of the head. The long path of the magnetic flux magnetizes the disk in a direction essentially perpendicular to the disk surface. The head and method depicted in FIG. 2 is commonly referred to as vertical recording.

As shown in FIG. 3, a hard disk drive stores information within tracks of the disk. Each track contains a plurality of magnetized areas that extend across the track. It has been found that because of edge effects, existing magnetic heads will create a magnetized area of the disk that slopes away from the leading edge portion of the head and creates a curve at the outer edge of the track. Overlapping magnetized edge portions of adjacent tracks can generate noise and even appear as a transition when the head is reading information from an adjacent track. The presence of noise can create an improper reading of information from the disk, particularly if the head is not on the center of the track. Additionally, noise can undermine a servo routine that maintains the head on the center of the track. It would be desirable to provide a vertical recording magnetic head that reduces the edge effects produced by magnetic heads in the prior art.

SUMMARY OF THE INVENTION

The present invention is a magnetic head that vertically records information on a disk and which creates erase bands between the disk tracks. The head has a single pole that has a pair of erase band segments which extend from a center pole section. When the head is writing information, the erase band segments create erase bands at the outer edges of the track by not fully magnetizing the disk and/or increasing the azimuth angle of the magnetized outer edges. The azimuth angle can be increased by constructing the outer segments of the pole to extend at an angle from the center pole section. The reduction in field strength in the outer track edges can be accomplished by making the outer pole segments thinner to cause a saturation of the outer magnetic field. The weaker, angled outer track portions do not generate a significant magnetic field in a head located on an adjacent track, thereby in effect creating erase bands in the disk.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
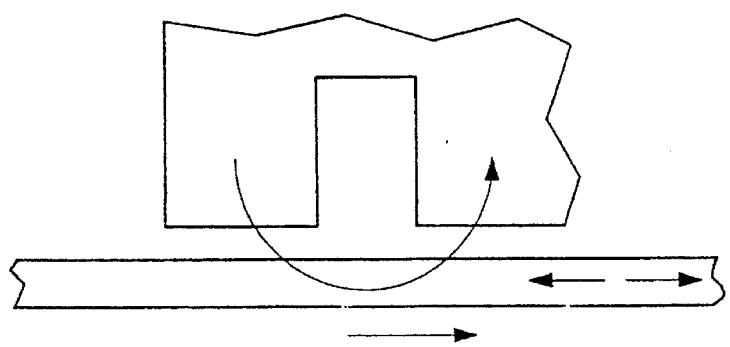
FIG. 1 is a side view showing a prior art head that horizontally records information on a disk.
Figure 2:
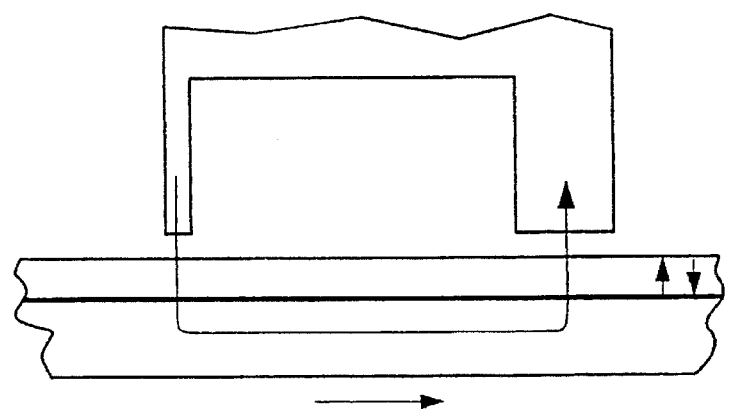
FIG. 2 is a side view showing a prior art head that vertically records information on a disk.
Figure 3:
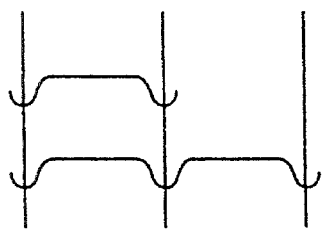
FIG. 3 is a top view showing magnetized areas of two adjacent tracks of a disk in the prior art.
Figure 4:
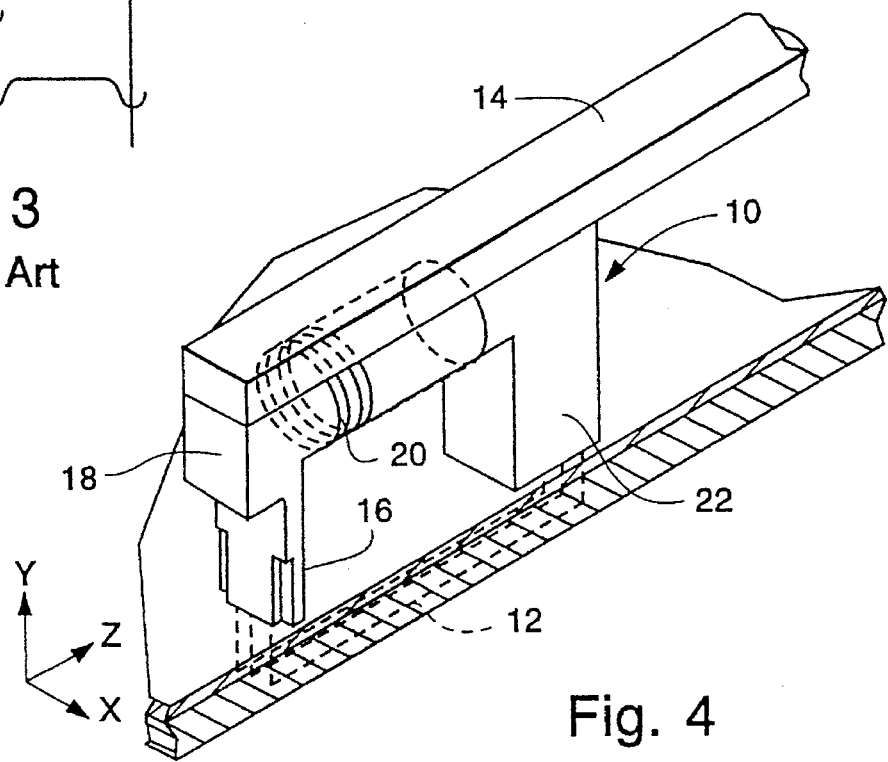
FIG. 4 is a perspective view of a magnetic head of the present invention.

Referring to the drawings more particularly by reference numbers, FIG. 4 shows a magnetic head 10 of the present invention. The head 10 is located adjacent to a disk 12. The head 10 is used to write and read information by magnetizing and sensing the magnetic field of the disk. The information is typically stored on annular tracks of the disk. The head 10 is mounted to an actuator arm 14 which suspends the head above the surface of the disk. The head 10 may or may not have a slider portion that creates an air bearing between the head and the disk surface. The actuator arm 14 typically has a voice coil motor (not shown) that moves the head from track to track.

The head 10 has a single pole 16 located at the end of a magnetic core 18. Coupled to the core 18 is a coil 20. The coil 20 is coupled to a source of current (not shown). Providing a current to the coil 20 generates a magnetic field that flows from the pole 16 and into the disk as shown in FIG. 4. The head 10 has a return element 22 located at the trailing edge of the core 18 which provides a return path for the magnetic flux. The long path between the pole 16 and the return element 22 causes the magnetic flux to flow through the disk in a direction that is essentially perpendicular to the surface of the disk. The disk thus become magnetized across the width of the head. Such a method of magnetizing the disk is commonly referred to as vertical recording.

Figure 5:
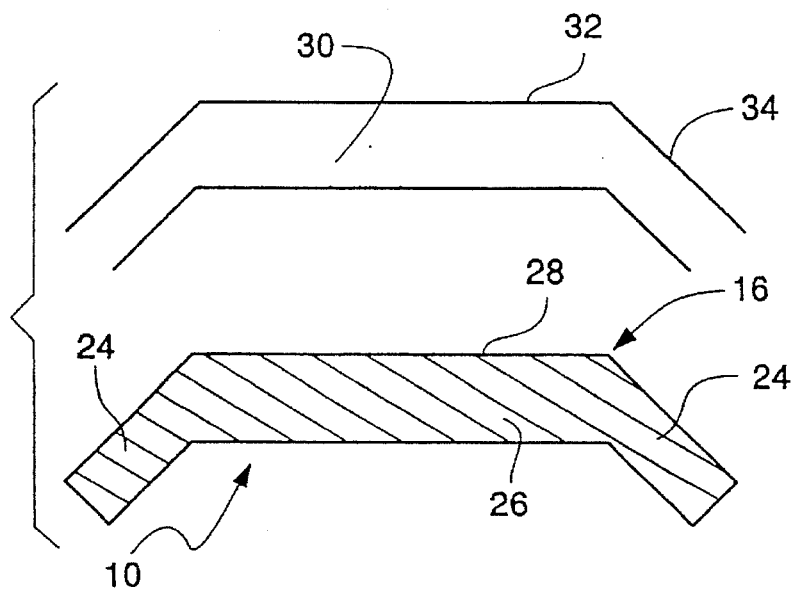
FIG. 5 is a top cross-sectional view showing the pole of the magnetic head of FIG. 4 magnetizing a magnetic disk.

As shown in FIG. 5, the pole 16 has a pair of erase band segments 24 that extend from a center pole section 26. In the embodiment shown in FIG. 5, the erase band segments 24 extend from the center section 26 at an angle relative to the leading edge 28 of the pole 16.

When a current is provided to the coil 20, the head 10 creates a magnetized area 30 of the disk. The magnetized area 30 has a transistion portion 32 that corresponds to the leading edge 28 of the pole 12 and a pair of edge portions 34 that correspond to the shape of the erase band segments 24. The edge portions 34 have a significant azimuth angle with respect to the transistion portion 32. The ability of the head to sense the magnetic field of the edge portions decreases with an increasing azimuth angle, because of the orientation of the resulting magnetic field. The erase band segments of the present invention create magnetized edge portions 34 that are not detected by the head. Consequently, the edge portions 34 will not generate a significant magnetic field when the head 10 is reading an adjacent track. The angled erase bands 24 effectively create erase bands 36 at the outer edges of the track.

Figure 6:
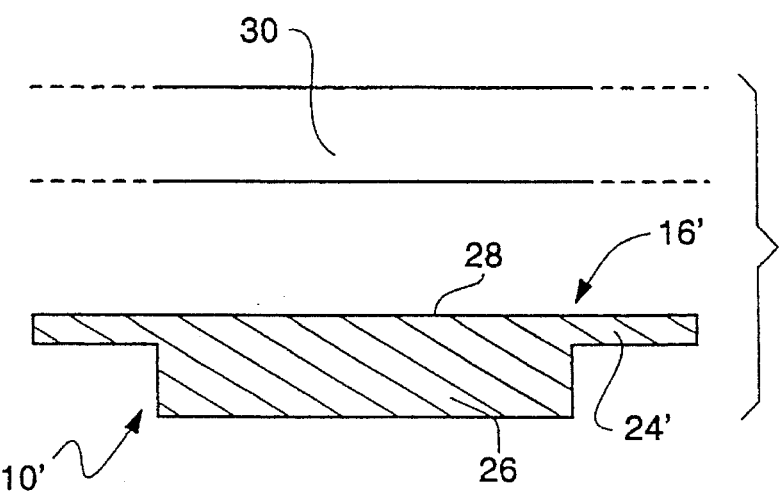
FIG. 6 is a top view similar to FIG. 5, showing an alternate embodiment of the pole.

FIG. 6 shows an alternate embodiment of a head 10' that has erase band segments 24' which are thinner than the center section 26. The thin erase band segments 24' create magnetic saturation areas within the pole 16'. The magnetic flux flowing from the saturated erase bands 24' is weaker than the flux emanating from the center section 26. The weak magnetic flux is unable to magnetize the disk with a strength that can be detected by the head. Thus the poorly magnetized outer track portions of the disk will not generate a magentic field that will create noise in the signals detected and generated by a head in an adjacent track.

Figure 7:
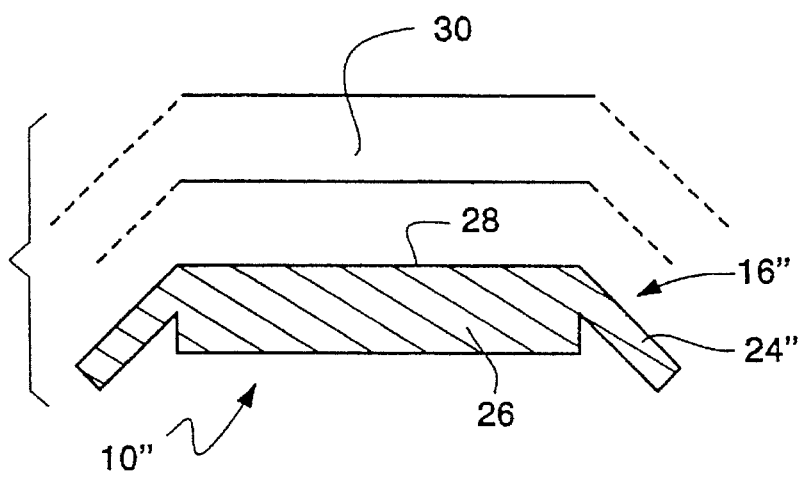
FIG. 7 is a top view similar to FIG. 5, showing an alternate embodiment of the pole.

FIG. 7 shows another pole 10" embodiment which has a pair of erase band segments 24" that are thinner than the center section 26 and extend from the center 26 at an angle relative to the leading edge 28 of the pole 16". The angled, thin erase band segments 24" create saturated pole areas that do not sufficiently magnetize the disk with a field strength that can generate noise on an adjacent track. Additionally, the magnetized edge portions of the disk are oriented to have an azimuth angle with the leading edge that is generally not detectable by a head in an adjacent track. The pole 16" of FIG. 7 thus combines the erase band features described and shown in FIGS. 5 and 6.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A magnetic head that vertically records information on a disk with a first layer for retaining information and a second layer for providing a magnetic pathway between a write pole and a return path element of the magnetic head, comprising:

a write pole having a center section with a first thickness and a first leading edge, and a pair of erase band segments that extend from said center section and each have a second thickness that is less than said first thickness of said center section;

a coil coupled to said write pole to create a magnetic field that flows from said center section and said pair of erase band segments of said write pole to the disk, wherein said first thickness of said center section of said write pole concentrates said magnetic field sufficient to magnetize a portion of the first layer of the disk adjacent to said center section with a first magnetic strength and said second thickness of said pair of erase band segments concentrates said magnetic field sufficient to magnetically saturate said pair of erase band segments and to magnetize a portion of the first layer of the disk adjacent to each of said erase band segments with a second magnetic strength that is less than said first magnetic strength; and a return path element for receiving said magnetic field provided by said write pole to the disk, said return path element being separated from said write pole by a first distance and having a third thickness that is greater than said first thickness of said center section, wherein said third thickness of said return path element is sufficient to disperse said magnetic field and inhibit magnetization along a portion of the disk adjacent to said return path element;

wherein, during operation of said magnetic head, the magnetic field from said center section magnetizes a track on the disk in a direction essentially perpendicular to a top surface of the disk to record information and the magnetic field from said pair of erase band segments create erase bands on each side of the track so that information on an adjacent track on the disk can be more accurately read.

2. The magnetic head as recited in claim 1, wherein said erase band segments are spaced from said leading edge a predetermined distance.

3. The magnetic head as recited in claim 1, wherein each of said pair of erase band segments has a second leading edge that extends from said center section at a nonzero angle relative to said first leading edge of said center section such that the magnetized portion of the disk adjacent to each of said pair of erase band segments extends at said nonzero angle from the magnetized portion of the disk adjacent to said center section.

4. The magnetic head as recited in claim 1, wherein said pair of erase band segments are formed from the same piece of material as said center section.

5. The magnetic head as recited in claim 1, wherein one of said pair of erase band segments has a second leading edge that extends from said first leading edge of said center section.

6. The magnetic head as recited in claim 1, wherein one of said pair of erase band segments has a second leading edge that extends from said first leading edge of said center section at substantially a zero angle relative to said first leading edge.

7. The magnetic head as recited in claim 1, wherein each of said pair of erase band segments have a second leading edge that extends from said first leading edge of said center section.

8. The magnetic head as recited in claim 1, wherein each of said pair of erase band segments have a second leading edge that extends from said first leading edge of said center section at substantially a zero angle relative to said first leading edge.

9. The magnetic head as recited in claim 1, wherein one of said pair of erase band segments has a second leading edge that extends from said center section at a nonzero angle relative to said first leading edge of said center section such that the magnetized portion of the disk adjacent to said one of said pair of erase band segments extends at said nonzero angle from the magnetized portion of the disk adjacent to said center section.

10. The magnetic head as recited in claim 1, wherein one of said pair of erase band segments has a second leading edge that extends from said first leading edge of said center section at a nonzero angle relative to said first leading edge of said center section such that the magnetized portion of the disk adjacent to said one of said pair of erase band segments extends at said nonzero angle from the magnetized portion of the disk adjacent to said center section.

11. The magnetic head as recited in claim 1, wherein each of said pair of erase band segments have a second leading edge that extends from said first leading edge of said center section at a nonzero angle relative to said first leading edge such that the magnetized portion of the disk adjacent to each of said pair of erase band segments extends at said nonzero angle from the magnetized portion of the disk adjacent to said center section.

12. The magnetic head as recited in claim 1, wherein said return path element is separated from said write pole by a distance greater than said predetermined thicknesses of said center section of said write pole.

13. The magnetic head as recited in claim 1, wherein said return path element is separated from said write pole by a distance greater than the combination of said predetermined thicknesses of said center section of said write pole and said return path element.

14. A magnetic head that vertically records information on a disk with a first layer for retaining information and a second layer for providing a magnetic pathway between a write pole and a return path element of the magnetic head comprising:

a write pole having a center section with a first thickness and a first leading edge, and a pair of erase band segments each having a second thickness and a second leading edge that extends from said center section at a nonzero angle relative to said first leading edge of said center section;

a coil coupled to said write pole to create a magnetic field that flows through said center section and said pair of erase band segments of said write pole, wherein said first thickness of said center section concentrates said magnetic field sufficient to magnetize a portion of the disk adjacent to said center section with a first magnetic strength and said second thickness of said pair of erase band segments concentrates said magnetic field sufficient to magnetize a portion of the disk adjacent to each of said pair of erase band segments with a second magnetic strength and extending at said nonzero angle from the magnetized portion of the disk adjacent to said center section; and a return path element for receiving said magnetic field from said write pole, said return path element being separated from said write pole by a first distance and having a third thickness that is greater than said first thickness of said center section, wherein said third thickness of said return path element is sufficient to disperse said magnetic field and inhibit magnetization along a portion of the disk adjacent to said return path element;

wherein, during operation of said magnetic head, the magnetic field from said center section magnetizes a track on the disk in a direction essentially perpendicular to a top surface of the disk to record information and the magnetic field from said pair of erase band segments create erase bands on each side of the track so that information on an adjacent track on the disk can be more accurately read.

15. The magnetic head as recited in claim 4, wherein said second leading edge of one of said pair of erase band segments extends from said first leading edge of said center section.

16. The magnetic head as recited in claim 4, wherein said second leading edge of each of said pair of erase band segments extends from said first leading edge of said center section.

17. The magnetic head as recited in claim 4, wherein said second thickness of each of said pair of erase band segments is less than said first thickness of said center section and concentrates said magnetic field sufficient to magnetically saturate said pair of erase band segments and to magnetize the portion of the disk adjacent to each of said erase band segments with said second magnetic strength, wherein said second magnetic strength is less than said first magnetic strength.

18. The magnetic head as recited in claim 4, wherein said pair of erase band segments are formed from the same piece of material as said center section.

19. The magnetic head as recited in claim 4, wherein said return path element is separated from said write pole by a distance substantially greater than said predetermined thicknesses of said center section of said write pole.

20. The magnetic head as recited in claim 4, wherein said return path element is separated from said write pole by a distance greater than the combination of said predetermined thicknesses of said center section of said write pole and said return path element.

21. A method of creating erase bands on a disk that is vertically recorded, comprising the steps of:

providing a magnetic head having a write pole and a return path element, said write pole including a center section having a first thickness and a leading edge, and a pair of erase band segments each having a second thickness and that extend from said center section at a nonzero angle relative to said leading edge, said return path element being separated from said write pole by a first distance and having a third thickness that is greater than said first thickness of said center section;

providing a coil coupled to said write pole;

providing a disk with a first layer for retaining information and a second layer for providing a magnetic pathway between said write pole and said return path element of said magnetic head;

placing said magnetic head adjacent to said disk;

energizing said coil to generate a magnetic field that flows through said center section and said pair of erase band segments of said write pole to said disk;

concentrating said magnetic field within said center section having said first thickness to magnetize a first portion of said first layer of said disk along a first line that corresponds to said leading edge and with a first magnetic strength;

concentrating said magnetic field within each of said pair of erase band segments having said second thickness to magnetize a second portion of of said first layer of said disk extending away from said first portion of said disk at a nonzero angle relative to said first line and with a second magnetic strength; and passing said magnetic field between said write pole and said return path element of said magnetic head through said second layer of said disk, said return path element dispersing said magnetic field and inhibiting magnetization along a portion of said disk adjacent to said return path element;

wherein, during operation of said magnetic head, the magnetic field from said center section magnetizes a track on the disk in a direction essentially perpendicular to a top surface of the disk to record information and the magnetic field from said pair of erase band segments create erase bands on each side of the track so that information on an adjacent track on the disk can be more accurately read.

22. The method of claim 5, wherein:

said second thickness of each of said pair of erase band segments is less than said first thickness of said center section; and said step of concentrating said magnetic field within said pair of erase band segments includes magnetically saturating said pair of erase band segments so that said second magnetic strength is less than said first magnetic strength.

23. A method of creating erase bands on a disk that is vertically recorded, comprising the steps of:

providing a magnetic head having a write pole and a return path element, said write pole including a center section having a first thickness, and a pair of erase band segments each having a second thickness that is less than said first thickness and that extend from said center section, said return path element being separated from said write pole by a first distance and having a third thickness that is greater than said first thickness of said center section;

providing a coil coupled to said write pole;

providing a disk with a first layer for retaining information and a second layer for providing a magnetic pathway between said write pole and said return path element of said magnetic head;

placing said magnetic head adjacent to said disk;

inducing a magnetic field to flow through said center section and said pair of erase band segments of said write pole to said disk;

concentrating said magnetic field within said center section of said write pole so that a portion of said first layer of said disk adjacent to said center section is magnetized with a first magnetic strength;

concentrating said magnetic field within said pair of erase band segments of said write pole so that said pair of erase band segments become magnetically saturated and magnetize a portion of said first layer of said disk adjacent to said pair of erase band segments with a second magnetic strength that is less than said first magnetic strength; and passing said magnetic field between said write pole and said return path element of said magnetic head through said second layer of said disk, said return path element dispersing said magnetic field and inhibit magnetization along a portion of said disk adjacent to said return path element;

wherein, during operation of said magnetic head, the magnetic field from said center section magnetizes a track on the disk in a direction essentially perpendicular to a top surface of the disk to record information and the magnetic field from said pair of erase band segments create erase bands on each side of the track so that information on an adjacent track on the disk can be more accurately read.

24. The method of claim 6, wherein:

one of said pair of erase band segments of said write pole extends at a nonzero angle relative to a leading edge of said center section of said write pole; and said step of concentrating said magnetic field within said one of said pair of erase band segments includes magnetizing the portion of said disk adjacent to said one of said pair of erase band segments so as to extend at said nonzero angle from the magnetized portion of said disk adjacent to said center section of said write pole.

25. The method of claim 6, wherein:

each of said pair of erase band segments of said write pole extend at a nonzero angle relative to a leading edge of said center section of said write pole; and said step of concentrating said magnetic field within said pair of erase band segments includes magnetizing the portion of said disk adjacent to each of said pair of erase band segments so as to extend at said nonzero angle from the magnetized portion of said disk adjacent to said center section of said write pole.

26. A magnetic head that vertically records information on a disk with a first layer for retaining information and a second layer for providing a magnetic pathway between a write pole and a return path element of the magnetic head, comprising:

a write pole having a center section with a first thickness and a pair of erase band portions that extend from said center section;

a coil coupled to said write pole to create a magnetic field that flows from said center section and said pair of erase band portions of said write pole to the disk, wherein said center section of said write pole concentrates said magnetic field sufficient to magnetize a portion of the first layer of the disk adjacent to said center section and said pair of erase band portions concentrates said magnetic field sufficient to magnetize a portion of the first layer of the disk adjacent to each of said erase band portions; and a return path element for receiving said magnetic field provided by said write pole to the disk, said return path element being separated from said write pole by a first distance and having a second thickness that is greater than said first thickness of said center section, wherein said second thickness of said return path element is sufficient to disperse said magnetic field and inhibit magnetization along a portion of the disk adjacent to said return path element;

wherein, during operation of said magnetic head, the magnetic field from said center section magnetizes the disk in a direction essentially perpendicular to a top surface of the disk to record information and the magnetic field from said pair of erase band portions create erase bands on each side of the track so that information on an adjacent track on the disk can be more accurately read.

27. The magnetic head as recited in claim 26, wherein one of said pair of erase band portions has a third thickness that is less than said first thickness of said center section.

28. The magnetic head as recited in claim 26, wherein one of said pair of erase band portions extends from said center section at a nonzero angle relative to a leading edge of said center section.

* * * * *